Sept. 19, 1939.　　　　A. E. McELROY　　　　2,173,369
COMPRESSED AIR FEEDING APPARATUS
Filed Oct. 26, 1936　　　　2 Sheets-Sheet 1
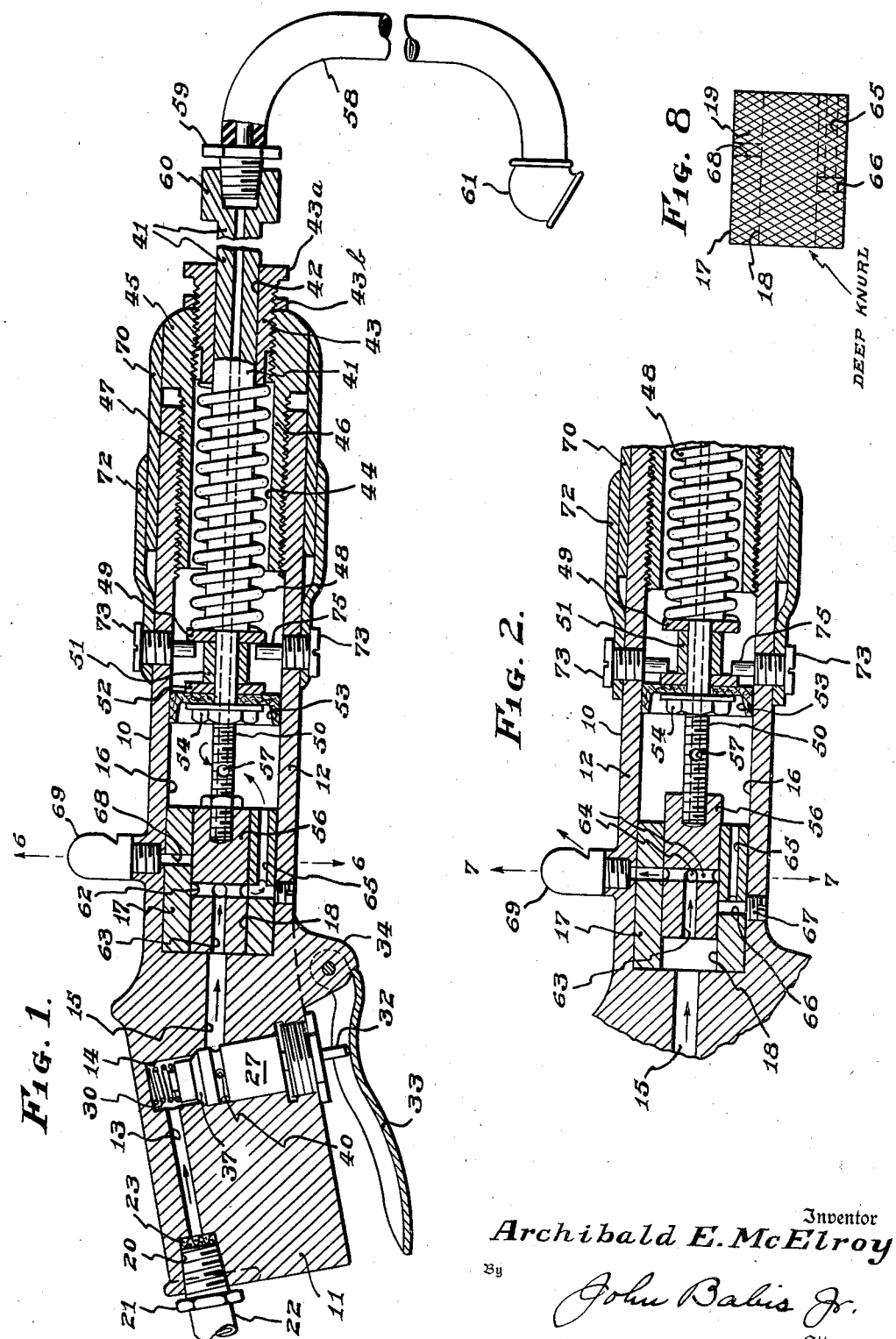
Inventor
Archibald E. McElroy
By
John Babis Jr.
Attorney Sept. 19, 1939.  A. E. McELROY  2,173,369
COMPRESSED AIR FEEDING APPARATUS
Filed Oct. 26, 1936  2 Sheets-Sheet 2
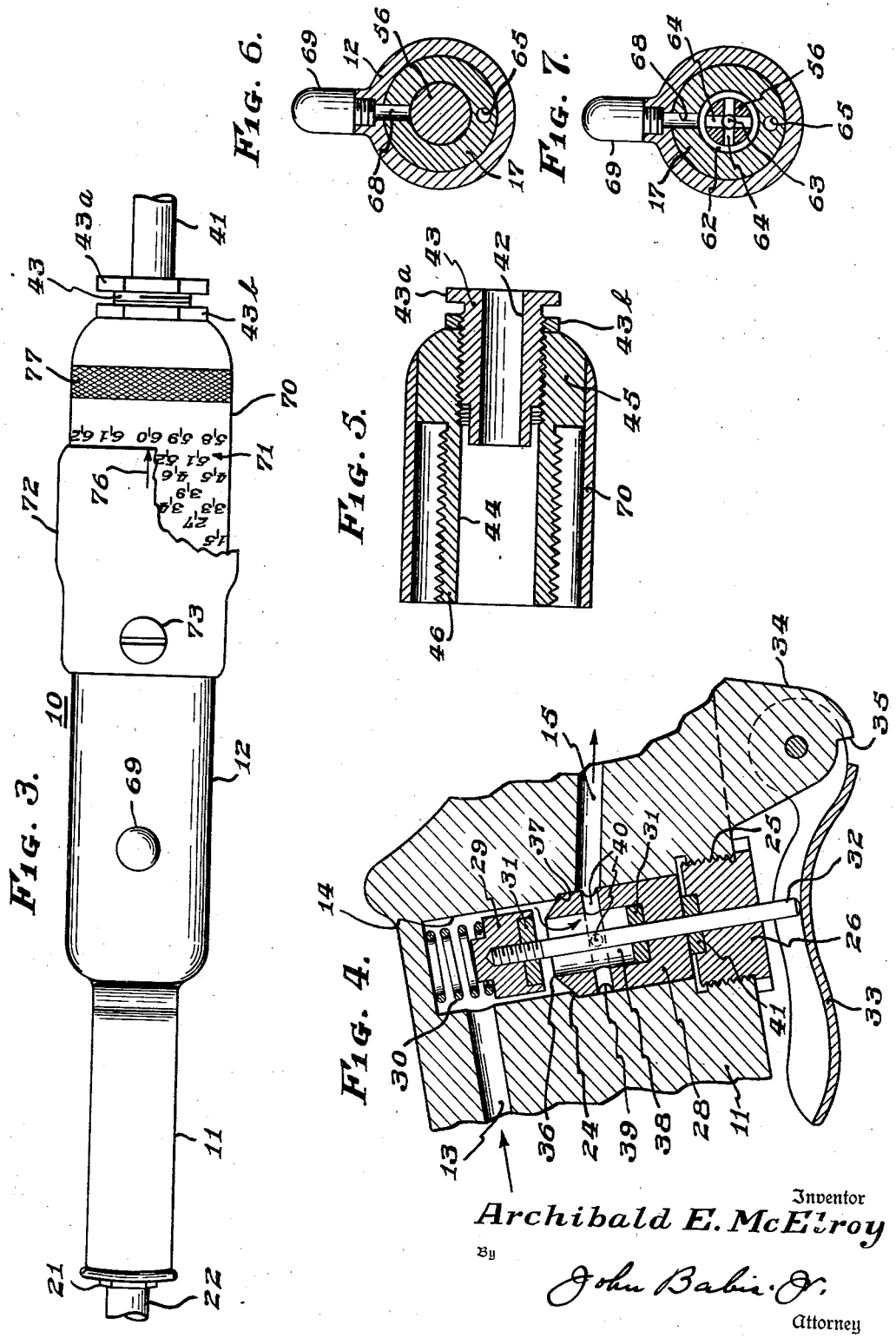
Inventor
Archibald E. McElroy
By John Babic Jr.
Attorney Patented Sept. 19, 1939

2,173,369

UNITED STATES PATENT OFFICE 2,173,369

COMPRESSED AIR FEEDING APPARATUS

Archibald E. McElroy, Philadelphia, Pa.

Application October 26, 1936, Serial No. 107,522

8 Claims. (Cl. 137—69.5)

This invention relates to compressed air feeding apparatus, and more particularly to a portable combined chuck and pressure gauge for use in inflating pneumatic tires or similar articles.

In known devices of this character, the amount of air desired to be supplied to a pneumatic tire, for example, is not readily determinable; that is, it is necessary to frequently check the air pressure in the tire while inflating the same. This is usually done by cutting off the air supply entering the device from a supply line in order to permit the pressure already in the tire to actuate a conventional gauge so that a reading of the pressure might be obtained thereon. If the pressure in the tire exceeds the desired amount, the procedure heretofore was to bleed off air until only an amount of air remained therein which gave the desired pressure.

Having in mind the large number of automobile service stations using a portable combined tire chuck and pressure gauge of conventional design, the foregoing procedure has certain disadvantages. For example, one serious objection thereto is that it entails considerable "guess-work" as to the amount of air being placed in a pneumatic tire. Another objection is that the frequent checking of the air pressure in a tire consumes the motorists' time and lowers the efficiency of the service station. Furthermore, there is always present the possibility of inflating a tire beyond its rated capacity, and, in the case of an operator who is careless and omits to check the air pressure within the tire, damage to the tire may result. All of the foregoing and other similar disadvantages render the conventional practice unsatisfactory.

The primary object of my invention is to provide an improved air inflating device which will not be subject to the foregoing disadvantages characteristic of prior art devices.

More specifically, it is an object of my invention to provide an improved portable combined tire chuck and pressure gauge wherein the air pressure regulating means is adapted to be preset to the pressure desired prior to attaching the device to a pneumatic tire for inflation thereof.

Another object of my invention is to provide an improved device of the character set forth wherein the possibility of supplying air to a pneumatic tire or similar inflatable article in excess of a predetermined pressure is obviated.

A further object of my invention is to provide an improved device of the character set forth which does not require that the inflating operation be interrupted to determine the pressure residing in the tire or other article being inflated.

Another object of my invention is to provide an improved device of the character specified wherein the pressure regulating means may be adjusted to compensate for seasonable temperature variations.

A still further object of my invention is to provide an improved device of the character specified which will deliver air pressure only to the amount for which the gauge has previously been adjusted or pre-set.

Another object of my invention is to provide an improved device of the character specified by means of which a pneumatic tire may be accurately and readily inflated without interrupting the operation to check the air pressure in the tire.

A still further object of my invention is to provide an improved device of the character described which embodies the accuracy and efficiency of the expensive, non-portable equipment now in use.

It is also an object of my invention to provide improved means for regulating and controlling the quantity of air admitted into a pneumatic tire or the like in accordance with a preselected pressure, which device will be comparatively simple in construction, yet highly efficient in use.

With the above and other objects in view, the invention resides in the novel construction, combination, and arrangement of parts, the novel features of which are set forth with particularity in the appended claims. The invention itself, however, both as to its organization and its method of operation, together with additional objects and advantages thereof, will best be understood from the following description of a specific embodiment, when taken in connection with the accompanying drawings, in which Figure 1 is a longitudinal sectional view of the combined tire chuck and automatic pressure gauge illustrating the interior mechanism in normal, or rest position, Figure 2 is a fragmentary sectional view similar to Fig. 1 illustrating the mechanism in the position occupied thereby when the air pressure has reached the desired value, Figure 3 is a top plan view of the improved device with a portion of the pressure indicating graduations exposed to view, Figure 4 is an enlarged fragmentary sectional view similar to Fig. 1 illustrating the control valve mechanism in open position, Figure 5 is a detail sectional view of the selective pressure adjusting sleeve, Figure 6 is a transverse sectional view taken on the line 6—6 of Fig. 1, Figure 7 is a similar view taken on the line 7—7 of Fig. 2, and Figure 8 is an elevational view of insert 17.

Referring more particularly to the drawings, wherein similar reference characters indicate corresponding parts throughout, I have shown, in Fig. 1, a housing or casing generally indicated by the numeral 10 and comprising a die-casting having a "pistol-grip" portion 11 and a cylindrical portion or body member 12 extending forwardly therefrom. In the die-casting art, it is well known that apertures, slots, and bore simulating channels, for example, may be formed during the die-casting operation. Accordingly, in die-casting the housing or casing 10, a plurality of channels or bores 13, 14 and 15 are formed in the pistol-grip portion 11 and a relatively large bore 16 is similarly formed throughout the length of the body portion 12. However, since die-cast metal may not prove satisfactory for a bearing surface where close tolerances must remain over extended periods of time, a relatively short bushing 17 of a more durable metal, such as brass, for example, and having a central bore 18 throughout its length and a deep knurl 19 formed in its outer periphery, (Fig. 8) for the purpose of causing the bushing to become firmly imbedded in the die-cast metal, is first properly positioned in the die preparatory to die-casting the casing 10. Accordingly, when the casing or body member 12 has been completed, the bore 15 opens into the bore 18 in the bushing 17 and the bushing bore 18 into the relatively large bore 16, as clearly shown in Figs. 1 and 2.

As clearly shown in Fig. 1, the inner end of the of the bore 15 opens into the transverse bore 14 the other end of the bore 13 opens into a short threaded bore 20, which is machined in the rear face of the pistol-grip portion 11, while one end of the bore 15 opens into the transverse bore 14 and its opposite end opens into the bore 18 in the bushing 17 with which it is concentrically formed.

The threaded bore 20 constitutes an inlet port or opening adapted to receive a threaded coupling member 21 which is carried by one end of a flexible compressed air supply line 22. A wire mesh screen 23 may be positioned between the bottom of the bore 20 and the coupling member 21 to preclude the entry of foreign matter.

In order to provide an air tight seat for an element to be hereinafter described, the transverse bore 14 is provided with an angular shoulder 24 at a point adjacent to where the bore 14 intersects the bore 15. The open end of the bore 14 is also counterbored, as at 25, and threaded for the reception of a closure member in the form of a gland nut 26. The transverse bore 14 extends into the pistol grip portion 11 a distance slightly beyond the point of intersection with the bore 13, whereby a path is established between the bores 13 and 15. The purpose of the transverse bore 14 is to provide a receiving chamber for a control valve asembly, generally indicated at 27, and a spring member adapted to act in conjunction with said assembly 27, the spring member being more fully hereinafter described.

The valve assembly 27 constitutes the control means whereby compressed air may be fed into the body member 12 and comprises a valve cage 28, (Fig. 4) a valve head 29, a spring 30 for maintaining the valve head 29 in air tight contact with the upper edge of the valve cage 28, and a valve stem 32 having its upper end screw threaded in the valve head 29. The valve stem 32 extends downwardly through a suitable bore in the bottom of the cage 28, then through the gland nut 26, and into co-operative contacting engagement with a hand control member 33 which is pivotally supported by a depending lug 34 formed on the underside of the casing 10. A shoulder 35, formed on the lug 34, co-operates with the hand control member 33 to limit the downward movement of the same, as clearly shown in Fig. 4.

The upper end of the valve cage 28 is tapered to provide a valve seat 36 for the valve head 29, and an angular shoulder 37 for engagement with the shoulder 24 formed in the bore 14, whereby the valve assembly 27 is properly located in the bore 14. A gasket (not shown) is preferably disposed between the shoulders 24 and 37, whereby an airtight joint may be more readily effected. The valve cage 28 is further provided with a central counterbore 38 which extends from the valve seat 36 to a depth substantially mid-way of the length thereof, and an annular groove 39 is formed in its periphery. A plurality of apertures 40 in the walls of the cage 28 which open from the bottom of the annular groove 39 into the counterbore 38 establish an air passage from the counterbore 38 to the bore 15 when the valve head 29 occupies an open position, as clearly shown in Fig. 4. Countersunk in the bottom face of the valve head 29 is a washer 31 of non-metallic material, while a similar washer is disposed in the bottom of the counterbore 38 and another such washer is countersunk in the inner face of the gland nut 26 whereby the uncontrolled escape of compressed air past the control valve seat 36 and around the valve stem 32 is obviated.

Disposed in the bore 16 formed in the cylindrical body member 12, co-axially therewith, is a tubular member 41 which has its outer end portion slidably disposed in an axial bore 42 (Figs. 1 and 5) formed in a spring tension adjusting screw plug 43 which is screw threaded in one end of a central bore 44 formed in a pressure regulating sleeve 45. The reduced inner end portion 46 of the regulating sleeve 45 is suitably threaded for engagement with the threaded portion 47 of the bore 16, as clearly shown in Fig. 1.

The tension adjusting screw plug 43 is provided in one end of the pressure regulating sleeve 45 for the purpose of increasing or decreasing the tension of a coil spring 48, presently to be described in greater detail, to compensate for seasonable temperature changes. In order that such an adjustment may be readily effected from the exterior of the body member 12, the screw plug 43 is provided with a flange 43ª of hexagon configuration and a similar lock nut 43ᵇ carried by the threaded portion of the plug 43. By loosening the nut 43ᵇ, the plug 43 is rendered free for adjustment in one direction or the other, depending upon whether more tension is to be applied to the spring member 48 to compensate for a drop in temperature, or whether the increased tension therein resulting from an increase in temperature is to be reduced to a predetermined value. After suitable adjustment of the plug 43, the nut 43ᵇ is again tightened to hold the plug 43 in adjusted position.

The coil spring 48, of pre-selected size and length, and adapted to offer the desired resistance to air pressure, is slipped over the tubular member 41 with one end of the spring in abutment with the inner end of the tension adjusting plug 43. The opposite end of the spring 48 terminates adjacent the inner, reduced and threaded portion 50 of the tubular member 41. An apertured disc 49 having a diameter greater than the coil spring 48, is passed over the reduced portion 50 of the tubular member 41 together with a spacing sleeve 51 and a second apertured disc 52. A piston 53 in the form of a cup washer of leather or the like is secured in place on the reduced portion 50 by a suitable washer and threaded lock nut, as indicated at 54.

The extreme inner end of the threaded portion 50 of the tubular member 41 is threaded centrally into one end of a cylindrical slide valve 56 which operates in the bore 18 of the bushing 17. A radial opening 57 provided in the portion 50 of the tubular member 41 at a point intermediate the piston 53 and the slide valve 56 provides a passage for compressed air into the interior of the tubular member 41, while a flexible hose 58 is connected to the exposed free end of the tubular member 41 by means of a threaded nipple 59 suitably secured in one end of the hose 58 and a threaded union 60 formed in the exposed end of said tubular member 41. The other end of the flexible hose 58 is provided with a conventional tire coupling chuck 61 whereby connection may be made with a pneumatic tire in the usual manner. When some other article is to be inflated, the chuck 61 may be replaced by other suitable coupling means.

Referring again to the bushing 17 cast within the casing 10 and to the slide valve 56, it will be observed that the slide valve 56 is provided in its periphery with an annular groove 62, a small axial bore 63 which extends inwardly to a point substantially midway of its length, and a plurality of radial openings 64 (Fig. 7) to provide a connecting air passage between the bore 63 and the annular groove 62. Similarly, the bushing 17, in which the slide valve 56 operates, is also provided with an offset longitudinal bore 65 in the wall thereof parallel with the central bore 18.

In order to complete an air passage between the annular groove 62 in the slide valve 56 and the offset bore 65, an opening 66 is provided in the wall of the bushing 17 through the cylindrical body portion 12 of the casing 10, and the opening thus formed in the wall of the body member 12 is subsequently closed by a headless set screw or the like 67. Similarly, another opening 68 diagonally opposite the lower opening 66 is also provided in the wall of the bushing 17 through the wall of the cylindrical portion 12 to provide a passage adapted to by-pass compressed air to a sound producing means, such as a whistle 69, for example, which is screw threaded in the opening 68.

Referring more particularly to Figs. 3 and 5, at this point, it will be noted that the pressure regulating sleeve 45 is also provided with a tubular sleeve 70 which is arranged in telescopic spaced relation thereon. The peripheral surface of the tubular sleeve 70 is provided with a series of spaced annular rows of numerals which are arranged in staggered relation and with a suitable mark, such as a line, for example, associated with each numeral to provide a scale 71 indicative of air pressure in pounds.

An additional tubular sleeve 72 having an inner diameter adapted to receive the outer diameter of the scale carrying sleeve 70 in one end thereof, and an inner diameter in its opposite end reduced to fit the outer diameter of the body portion 12 is secured to said body portion by means of the screws 73. Moreover, the screws 73 are each provided with a small pinlike extension 75 which projects into the bore 16 at diametrically opposite points where they act as stops to limit the longitudinal movement of the tubular member 41 by engaging one or the other of the discs 49 and 52, as clearly shown in Figs. 1 and 2. When the parts are in the position shown in Fig. 1 under the influence of the energy stored in the spring 48, the pins 75 act as a stop against which the disc 49 abuts. However, when the piston 53 and the slide valve 56 have been moved to the position shown in Fig. 2 under the influence of energy stored in the compressed air within the body member 12, in a manner more fully hereinafter set forth, the disc 52 abuts against the stop pins 75 to insure registration of the annular groove 62 with the by-pass port 68.

The tubular sleeve 72 serves as a shield for the protection of the scale 71 against obliteration and further to provide a surface for the reception of a pointer, zero mark, or line, for example, as indicated by the arrow 76. The peripheral surface of the scale carrying sleeve 70, adjacent the outer end thereof, is provided with an annular knurling 77 to facilitate the rotary adjustment thereof.

The operation of my improved gauge and tire chuck is as follows:

Assuming that the improved gauge and tire chuck herein described are connected to a compressed air supply by means of the flexible hose 22 and that the coupling chuck 61 is properly connected to the valve stem of a pneumatic tire requiring inflation to a pressure of 60 pounds per square inch, for example, the pressure selecting sleeve 70 is first adjusted to bring the numeral 60 in exact registration with the arrow 76 and thereupon the handle 33 is manually urged toward the piston grip portion 11 to operate the control valve assembly 27. The compressed air supply will now flow through the control valve assembly 27, through the various ports and passages in the slide valve 56, through the tubular member 41 via the aperture 57, through the outlet hose 58 and into the tire. As soon as the pressure in the tire reaches 60 pounds per square inch, an equal pressure will almost simultaneously build up within the body member 12 rearwardly of the piston 53. Continued admission of compressed air into the body member 12 will quickly build up a pressure therein in excess of 60 pounds per square inch, and, since the spring 48 has been previously set to yield at this pressure, the compressed air within the body member 12, acting against the piston 53, will overcome the resistance of the spring 48, whereupon the tubular member 41 will be moved forwardly and the slide valve 56 therewith to by-pass the compressed air supply through the whistle 69. This, of course, will give the operator audible notice that the tire has been inflated to the desired pressure, while at the same time automatically shutting off further supply of air to the tire.

Although one specific embodiment of the invention has been illustrated and described, it is to be expressly understood that many modifications thereof are possible. The invention, therefore, is not to be restricted except insofar as is necessitated by the prior art and by the spirit of the appended claims.

I claim as my invention:

1. In a device of the character described, the combination of a hollow body member, a manually operable inlet control valve therefor, a coupling chuck including a flexible tube adapted to be connected to the valve of an article to be inflated, a slide valve including a tubular member within said body member and coupling said control valve to said coupling chuck, means including a resilient member for limiting the amount of air passing through said tubular member to said chuck, adjustable means for regulating said resilient member to compensate for temperature changes, and means for by-passing the air to the atmosphere when a predetermined pressure has been built up in said body member, said predetermined pressure causing relative movement between said body member and said tubular member.

2. In a device for feeding compressed air to an inflatable article, the combination of a body member having an inlet, a fixed outlet, and a second outlet movably mounted within said body member, a coupling chuck connected to said movable outlet and adapted to couple said device to said article, a manually operable valve for controlling the admission of compressed air into said body member through said inlet, means for selectively presetting the amount of air to be admitted into said article to provide a predetermined pressure therein, and means effective when said predetermined pressure has been reached to by-pass any further compressed air entering said inlet from said movable outlet to said fixed outlet, said last named means including a resilient element and means for adjusting the resiliency thereof in accordance with varying temperature conditions.

3. In a portable device for feeding compressed air to an inflatable article, a hollow body member provided with an inlet, a fixed outlet and a movable outlet, a slide valve within said body member, said movable outlet comprising a tubular member coupled to said slide valve and movable therewith within said body member, said slide valve being constructed and arranged to normally couple said inlet only to said tubular member and to block off the passage of air from said inlet to said fixed outlet, a piston fitted within said body member and carried by said tubular member for movement therewith, spring means constantly urging said piston and said slide valve to normal position, and means for adjusting the tension of said spring in accordance with a predetermined pressure to be applied to the inflatable article, said spring means being adapted to yield under the influence of air pressure built up within said body member and acting against said piston when the pressure within said article has reached said predetermined value to move said tubular member and said slide valve to a second position wherein the air admitted through said inlet is by-passed to said fixed outlet.

4. The invention set forth in claim 3 characterized in that said body member comprises a die casting having a cylindrical bushing of a more durable metal permanently anchored in said body member concentrically therewith, said bushing being provided to receive said slide valve in its bore.

5. The invention set forth in claim 3 characterized in that said body member and said tubular member are provided with co-operable stop means for limiting the movement of said slide valve in response to the action of compressed air against said piston.

6. In a device for feeding compressed air to an inflatable article, the combination of a hollow body member having an inlet, a by-pass outlet, and a movable outlet within said body member, said last named outlet comprising a tubular member concentrically arranged within said body member, a slide valve secured to one end of said tubular member and adapted to pass compressed air from said inlet to said movable outlet, a coupling chuck including a flexible tube connected to the other end of said movable outlet and adapted to couple said device to said article, a manually operable valve for controlling the admission of compressed air into said body member through said inlet, means for selectively presetting the amount of air to be admitted into said article to provide a predetermined pressure therein, and means effective when said predetermined pressure has been reached to move said slide valve and tubular member relative to said body member whereby to by-pass any further compressed air entering said inlet from said movable outlet to said by-pass outlet, said last named means including a resilient element and means for adjusting the resiliency thereof.

7. In a device for feeding compressed air to an inflatable article, the combination of a hollow body member having an inlet, a by-pass opening and an outlet within said body member, a tubular member including a ported cylindrical valve concentrically arranged within said body member and adapted in one position to pass compressed air from said inlet to said outlet, and in another position from said inlet to said by-pass opening, a coupling chuck including a flexible tube connected to said outlet and adapted to couple said device to said article, a manually operable valve associated with said inlet for controlling the admission of compressed air into said body member and tubular member through said inlet, means for selectively presetting the amount of air to be admitted into said article to provide a predetermined pressure therein, and means effective when said predetermined pressure has been reached to cause relative movement between said body member and said tubular member whereby any further compressed air entering said inlet is by-passed from said tubular member to said by-pass opening, said last named means including a resilient element and means for adjusting the resiliency thereof in accordance with varying temperature conditions.

8. In a device of the character described, the combination of a hollow body member, a manually operable inlet control valve therefor, a coupling chuck including a flexible tube adapted to be connected to the valve of an article to be inflated, a slide valve including a tubular member within said body member and coupling said control valve to said coupling chuck, means including a resilient member for limiting the amount of air passing through said tubular member to said chuck, adjustable means for regulating said resilient member to compensate for temperature changes, and means responsive to a predetermined air pressure within said body member whereby relative movement between said body member and said tubular member is effected to cut off the flow of air to said coupling chuck.

ARCHIBALD E. McELROY.